United States Patent [19]

Holler

[11] 3,954,433
[45] May 4, 1976

[54] METHOD OF AND APPARATUS FOR COORDINATING THE APPLICATION OF HEAT TO A MELT FROM SOURCES ABOVE AND BELOW THE MELT SURFACE

[75] Inventor: Robert W. Holler, Toledo, Ohio

[73] Assignee: Owens-Corning Fiberglas Corporation, Toledo, Ohio

[22] Filed: Aug. 22, 1974

[21] Appl. No.: 499,732

[52] U.S. Cl. .................................... 65/29; 65/161;
 65/162; 65/337; 65/DIG. 13
[51] Int. Cl.² ............................................. C03B 5/24
[58] Field of Search .............. 65/29, 161, 162, 337,
 65/DIG. 13

[56] References Cited
UNITED STATES PATENTS

| | | | |
|---|---|---|---|
| 3,326,655 | 6/1967 | Penberthy | 65/337 X |
| 3,506,427 | 4/1970 | Griem, Jr. | 65/29 X |

Primary Examiner—Arthur D. Kellogg
Attorney, Agent, or Firm—John W. Overman; Charles F. Schroeder; David H. Wilson, Jr.

[57] ABSTRACT

Heat softenable material, typically glass, is heated in a furnace from above its surface, as by fossil fuel burners, and below its surface, as by Joule effect heating by electrical current flowing between electrodes immersed in the melt where predetermined relationships of the amount of heat supplied from each source is automatically established. One form of coordinated control employs ratio control where the relationship of fossil fuel burner heat supplied is maintained in constant proportion to the Joule effect heat supplied. Melter temperature is a primary control for a combustion air supply. A combustion air-fossil fuel ratio controller proportionally controls Joule effect heat applied in one embodiment. In other embodiments the electrical controller provides the master signal to a combustion air control proportionate to the requisite change of heat input dictated, or the combustion air control issues a ratio signal to the electrical controller for proportional changes.

21 Claims, 5 Drawing Figures

METHOD OF AND APPARATUS FOR COORDINATING THE APPLICATION OF HEAT TO A MELT FROM SOURCES ABOVE AND BELOW THE MELT SURFACE

BACKGROUND OF THE INVENTION

This invention relates to melting furnace systems and methods of melting and more particularly to such systems and methods in which heat is applied within the mass of the melt constituents and in the region above that mass in a coordinated manner.

Heretofore it has been known to melt materials by developing heat within their mass and by applying heat external of their mass. In the discussion of this invention which follows these techniques and apparatus will be illustrated as applied to the melting and refining of glass. While certain aspects of the invention are particularly adapted to glass, particularly to Joule effect heating of molten glass having a negative temperature coefficient of resistance, it is to be understood that other heat softenable materials can be processed utilizing other features of the invention.

Glass has been melted in receptacles which include a closed top where heat is applied above the surface of the constituent mass as by the burning of fossil fuels within the enclosure or by electrical heating of resistors which adjust heat. It has also been heated or maintained molten by Joule effect heating involving the passing of electrical current between electrodes immersed in the constituent mass. Combinations of radiant heating and Joule effect heating have also been employed as where the preponderance of heat was derived from radiant heat, termed "electric boost" operation and conversely where the preponderance of heat was derived from Joule effect heating, particularly where fossil fuel was burned, termed "fossil fuel boost" operation.

Attempts have been made to coordinate heat input to melting furnaces with the heat required to establish and maintain desired conditions as by measuring the rate of feed of batch material into a melter and regulating the amount of heat supplied to the melter according to the batch feed rate as disclosed in Griem Pat. No. 3,573,017 of Mar. 30, 1971, for "Method and Apparatus for Melting and Supplying Heat-Softenable Materials in a Process." Another controlled melting approach is to alter the application of heat based on the level of molten material in the melter as disclosed in Trethewey Pat. No. 3,482,956 of Dec. 8, 1969, for "Method and Apparatus for Operating a Glass Melting Furnace."

While automatic or feedback control of melting operations have been utilized with some success they have generally been confined to a single form or region of heat application to the melt.

SUMMARY OF THE INVENTION

According to the present invention the application of heat from an upper and a lower heat source in the melter is coordinated to establish desired relationships of heat application. More particularly, the temperature of a mass of material in a melter is controlled by the application of heat in an upper-heating region above the mass, as by radiant heat application above a mass of glass and glass batch, and by the application of heat by a lower heating means adapted to heat the mass from within, as by Joule effect electric heating, and the respective heat sources are controlled automatically in an interrelated manner to establish desired relationships in the proportions of heat supplied from the sources.

A particular feature of the method and apparatus of this invention is the proportioning of the applied heat from the several heat sources according to heat requirements.

In a preferred embodiment temperature is sensed in the region of the crown or closed top of the receptacle above the surface of the constituent mass. This crown temperature is utilized to control the amount of combustion air and thus the amount of fuel-air mixture supplied to the melter burners. A ratio controller in the fuel-air supply system also controls the Joule effect heat developed in the molten glass by controlling the power to electrodes immersed in the melt. Either the burners or the electric heat system can be the primary heat source, while the other source can act as a "booster".

Processors can be employed to develop control signals in accordance with conditions sensed at several stations as the temperature in the crown above the region of the hot spot, the under glass temperature at the hot spot along the furnace length, and/or the melt level.

Further, while fixed ratios of applied heat from the upper and lower heat sources can be established, these ratios can be varied with conditions, and longitudinal or transverse heat profiles in the melt can be controlled in one heat source in conjunction with the adjustments in the other source as shown, for example, for a longitudinal heat profile of Joule effect heating in U.S. patent application Ser. No. 352,833 for "Electric Glass Furnace with Zone Temperature Control" by R. W. Holler and R. E. Rothrock. A coordination of these heat source control settings to establish desired thermal profiles as glass flows through a furnace is extremely important to the quality of the products produced from the glass since localized lower viscosity of the glass will cause channelization and may cause the discharge of non-uniform or incompletely refined glass from the furnace.

Another feature of the method and system of this invention is the automatic maintenance of desired interrelationships of the heat quantities supplied from upper and lower heat sources such that a shift of a temperature set point results in a proportionate adjustment of the heat supplied from each source. Alternatively, changes in the proportions of supplied heat controlled by a processor may be dictated by other factors such as the application of greater heat from melter burners during the heat-up of a furnace and, when operating temperature is approached, a transfer to Joule effect heating as the preponderant heat source. Temperature profile in the melt can also be automatically adjusted by coordinated control of the upper and lower heat sources by the processor.

DESCRIPTION OF THE PREFERRED EMBODIMENTS

Figure 2:
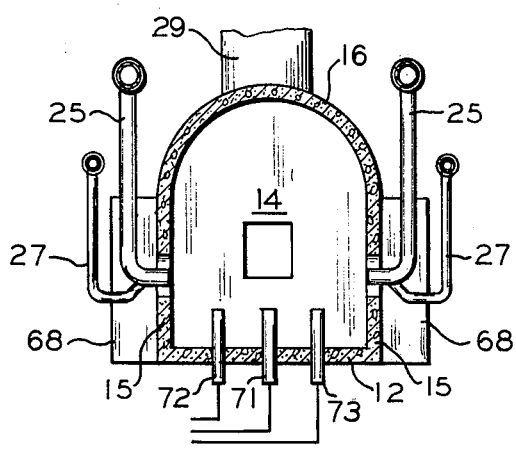
FIG. 2 is a schematic cross sectional view of the furnace of FIG. 1 taken along the line 2—2 of FIG. 1 to illustrate typical electrode, combustion air feed and fuel feed arrangements.

The invention is illustrated in association with a generally conventional form of glass melting furnace 11 having a floor 12, front and rear walls, 13 and 14, and side walls 15 and a crown 16, (FIG. 2). Glass constituents 17 (see FIGS. 3-5), comprising glass batch 18 fed at or near the rear walls and molten glass 19 in various states of refinement, have an upper surface 21 above which are burner ports 22 for conventional fossil fuel burners 23 illustrated as the ends 24 of combustion air ducts 25 and the ends 26 of fuel gas ducts 27. The burners 23 direct the combustible gas-air mixture into the furnace 11 above the glass constituents 17 and the products of combustion and gases which may be evolved from the glass constituents are passed to a stack 28 having a conventional recuperator 29 for preheating combustion air.

Combustion air is fed from blower 31 through ducting 32 combustion air control valves 33, typically valves with all-electric topworks 34 control, to the recuperator 29. The air passed by valves 33 is, in turn, preheated by recuperator 29 and passed by ducting 35 to combustion air manifold 36 supplying the individual burner combustion air ducts 25. A flow sensor 37 for the combustion air from the recuperator in the form of a differential pressure cell develops an EMF passed by flow transmitter 38 as an electrical signal entering into the system control functions.

Fuel and combustion air are supplied to the burners in the proper proportions by interrelated controls responsive to electrical signals. Fuel supply 39 is coupled by ducting 41 through a gas pressure regulator 42, when the fuel is gas, a gas flow orifice plate with an associated differential pressure cell 43, and a gas control valve 44 which can be provided with an electric topworks control 45 responsive to ratio controller 46. Fuel in controlled quantities flows from ducting 41 to manifold 47 from which it is fed to the individual fuel ducts 27 for each of burners 23.

Figure 1:
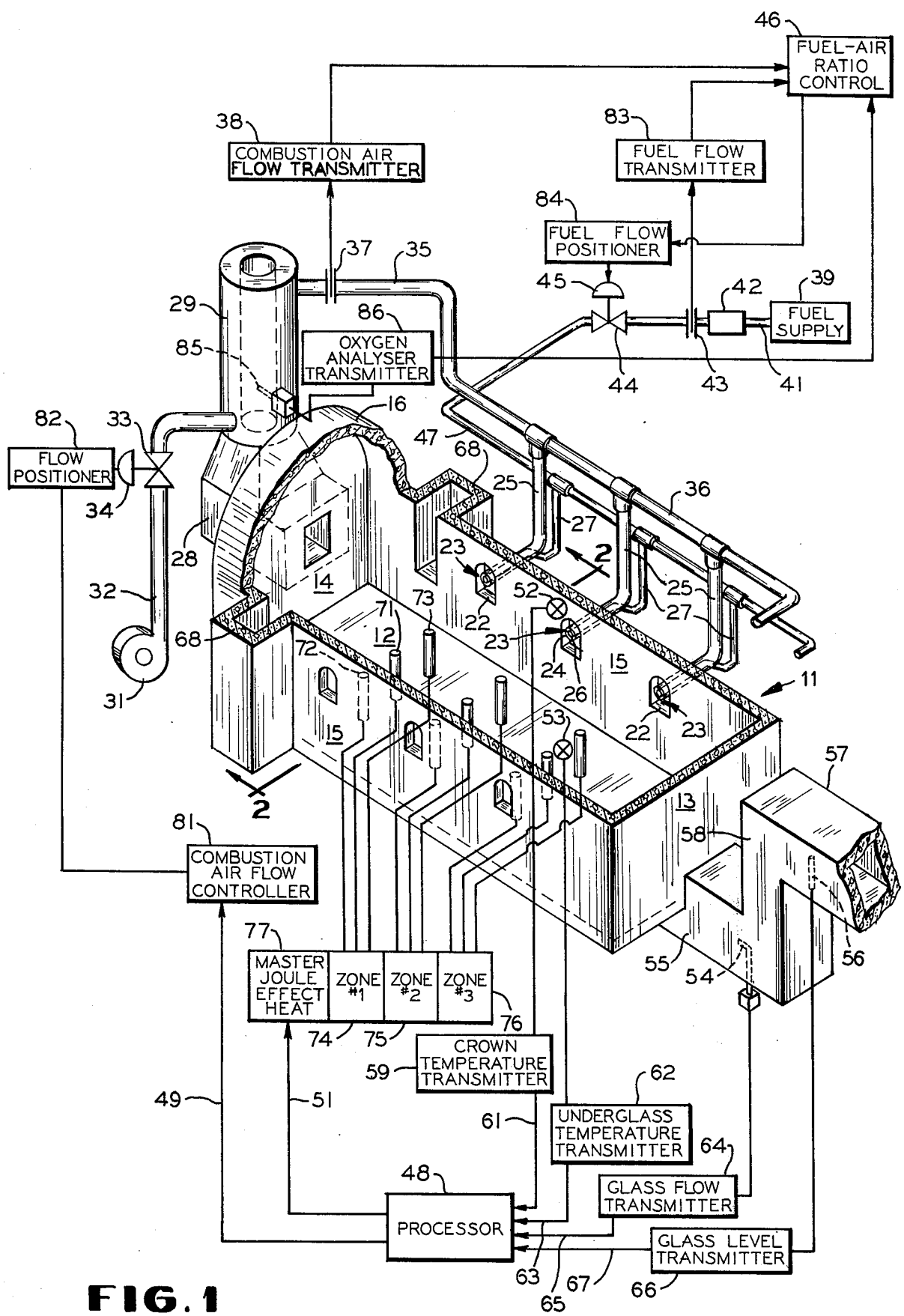
FIG. 1 is a schematic diagram of a furnace for heating molten glass shown in perspective with the furnace crown removed and no glass or batch present and with the controls for a fuel burner system above the glass constituents and controls for a Joule effect heating system having electrodes below the surface of the glass constituents showing a general form of coordinated control of the two heat controllers.

In the various figures like elements are assigned like reference characters. In FIG. 1 four heat requirement sensing means are shown while in FIGS. 3, 4, and 5 only a single such means is shown. It is to be understood that FIG. 1 is employed as illustrative of the broad concept of sensing a change in one or more heat requirement defining means and reacting to the changed condition as a result of a programmed response in a processor 48 which issues coordinated corrective signals on fossil fuel burner control output 49 and Joule effect heater control output 51. Thus, while analog signals could be applied to, manipulated in, and issued from the processor, it is more common to manipulate digital signals and to employ digital inputs and outputs either as direct responses by the controllers and direct inputs from the transmitters or to employ digital-to-analog and analog-to-digital converters in the processor where analog signals are received and issued by the processor.

Heat requirements in FIG. 1 are indicated by a crown thermocouple 52, by an underglass thermocouple 53, by a glass flow detector 54 in the throat 55, and a glass level detector 56 in the conditioning channel 57 or forehearth. Glass is passed to a refiner 58 from the melter through the throat 55, and the conditioning channel 57 extending to the forehearth (not shown) from which glass is withdrawn for forming.

An indication of a change in conditions in the system which requires a change in heat applied applies an input to the processor 48. Each sensor imposes an analog signal at the microvolt level which is translated to a millivolt level and compared with a set point to issue an error signal representing the deviation from the desired condition. These transmitters can also convert the error signal to a digital value where desired for processing in the processor. Thus crown temperature transmitter 59 has lead 61 to the processor, under glass temperature transmitter 62 has lead 63, glass flow transmitter 64 has lead 65, and glass level transmitter 66 has lead 67.

A signal calling for the application of more heat as by a deviation of crown and/or underglass temperature beyond the dead zone around the respective set points dictated additional heat for temperature drops below the set points and reduced heat for temperature increases above the set points. An increase of glass flow or a decrease in glass level indicates that additional relatively cold batch will be introduced at the doghouses 68 at the back of the melter or that hot glass will be withdrawn at a greater rate than that for which system thermal equilibrium had been established so that additional heat will be required while a decreased flow or increased glass level will dictate the converse. Relationships of a cumulative or counteracting nature can also be experienced and the processor can be arranged to accommodate these by changes in heat input to the system.

While processor control is primarily applicable to a relatively narrow range of conditions in the molten glass which are suitable for forming the product desired, it is to be appreciated that the processor can also be employed to change the relative contributions of heat from the above melt surface and below melt surface heat sources. A processor can be programed to provide other than a fixed ratio of heat from the two types of sources for conditions other than normal operations, such as in cooling or reducing flow rate for repairs, or temporary shut down or during heat-up as at start of a campaign or from a temporary shutdown. Under heat-up, where the glass is not yet molten between electrodes across which a potential is applied, or where, due to the negative temperature co-efficient of the glass, it is of such high resistivity that Joule effect heating with the available voltage is insufficient to provide significant amounts of heat, fossil fuel firing is the preponderant or even exclusive heat source. As the temperature increases and the resistivity of the molten glass reduces, Joule effect heating can be programed to supply a greater proportion of the heat.

In electric melt-fossil fuel burner boost systems, where essentially cold top operation of the melter is desired, typically about 90 percent of the heat is supplied by Joule effect heating. Fossil fuel firing above the batch blanket during production conditions can be employed in only a minor degree to add heat to the melt, as by preheating the batch and by glazing the blanket to reduce the evolution of dust therefrom.

Joule effect heating is illustrated as zoned into three zones extending transverse of the furnace, although the number of zones is not significant in the present invention. Each zone is heated by a pair of circuits having a central common electrode 71 and a side electrode 72 or 73. The number of circuits per zone and the electrode arrangement are not limited in this invention although the illustrative system is more completely set forth in the aforementioned Holler and Rothrock patent application. Each circuit in that type of system is supplied with alternating current as by means of one half of a center-tapped secondary of a zone power transformer to each circuit. Control of the current to the electrodes through back-to-back SCRs by controlled firing may be by means of a firing control providing constant average r.m.s. current controlled in turn by one or more temperature sensing thermocouples for the zone, and by current transformers to each circuit (none of which is shown). The above circuits are represented as individual zone control and supply circuits 74, 75 and 76 for zones Nos. 1, 2 and 3. A master Joule effect controller 77 can be arranged to establish a thermal profile longitudinal of the furnace by virtue of its control of the individual zone control circuits 74, 75 and 76 whereby appropriate power can be imposed on respective zones to establish the profile for the system thermal parameters.

When operating in range for production of product, assume that a constant proportion of Joule effect heat to fossil fuel burner heat is maintained. In the example, the processor 48 establishes and maintains this ratio by control signals to the master Joule effect controller 77 and to the combustion air flow controller 81. These signals are scaled to proportion the change in the amount of heat from each source.

Heat from the fossil fuel burners is controlled by control of combustion air. An indicated change in required heat causes processor 48 to call for that change at 77 and 81. Combustion air flow controller 81 calls for a change through flow positioner 82 which applies a signal to topworks 34 of valve 33 to change the flow of combustion air to and through recuperator 29. This change is sensed at the flow sensor 37 to issue a signal translated by combustion air flow transmitter 38 for ratio control 46. When this signal indicates a deviation from the preset ratio of air to fuel flow sensed by fuel flow detector 43 and translated for the ratio controller by fuel flow transmitter 83, ratio control 46 issues a signal to fuel flow positioner 84 which tends to correct the ratio to the preset value. Positioner 84 translates the signal to a control level for fuel valve top works 45 which causes fuel valve 44 to be adjusted in a ratio correcting manner. Trim of the setting of the combustion air-fuel ratio by ratio controller 46 is afforded by analysis of the flue gases from melter 11.

In the case of gas fired burners the furnace is maintained somewhat oxidizing by a ratio of air-to-gas of about 10 to 1. An oxygen analyzer 85 is located in the flue and issues an electrical signal which is translated by oxygen analyzer transmitter 86 for ratio control 46. Thus, where the oxidizing nature of the furnace atmosphere deviates from the desired level a signal is applied to ratio control 46 to alter the fuel supply in a corrective manner.

Figure 3:
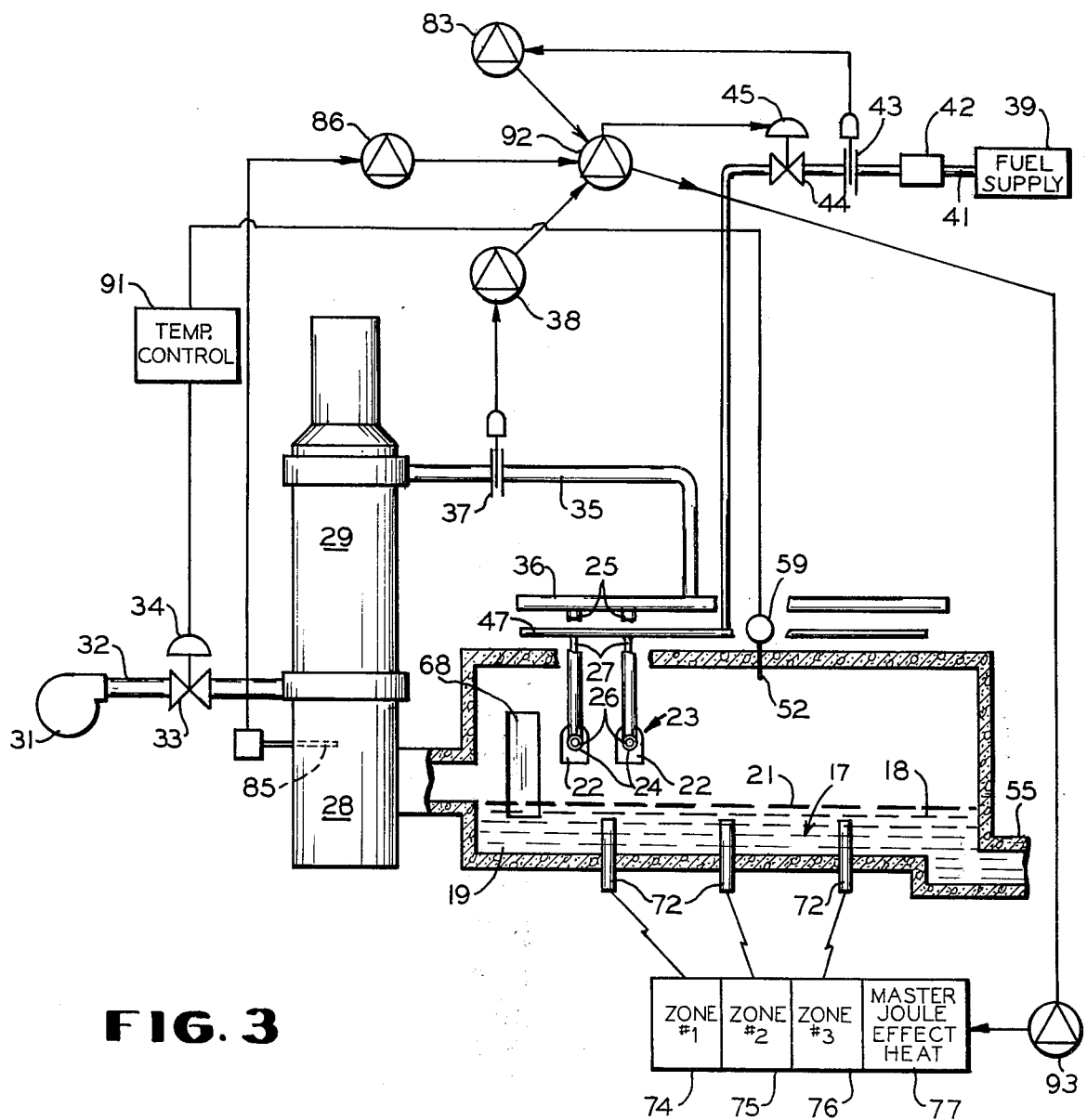
FIG. 3 is a side elevational view of a schematic furnace of the type shown in FIG. 1 employing another schematically illustrated form of coordinated control wherein primary heating is by fossil fuel firing and Joule effect electric heat boosting is coordinated by means of a ratio controller for the fossil fuel and combustion air.

FIG. 3 illustrates a system wherein the ratio control issues proportioning signals to control the fuel supply and the Joule effect heat.

Fuel firing is responsive to heat requirements within the furnace as, for example, derived at a melt crown thermocouple 52. The temperature controller 91 incorporates an amplifier or temperature signal transmitter, which develops an EMF in an operating level from the thermocouple millivolt level signals, and a set point unit, which can be preset to a signal level representative of the signal from the amplifier representing a desired temperature, to compare that signal with the transmitter signal and issue an error signal. Typically the transmitter signal and the set point signal are compared or algebraically summed to produce an output or error signal proportional to the difference in the sensed temperature from the set point temperature, usually with some constraints on response to deviations between the signals in a range termed a "dead zone" which minimizes hunting of the controls responsive to the error signal. Control of fuel firing in the illustrative system of FIG. 3 is by temperature control of the amount of combustion air through signals from temperature controller 91 to combustion air control valves 33. The amount of fuel applied to the burners is proportioned to the amount of combustion air by means of the signal from flow sensor 37, indicating combustion air flow to the burners to the master ratio controller 92.

Master ratio controller 92, as in the case of ratio controller 46 of FIG. 1, maintains the air-fuel ratio by comparison of a signal developed in response to the signal from air flow sensor 37 as it is compared to a signal proportional to fuel flow developed in response to the signal from fuel flow transmitter 83 responsive to cell 43. The output signal of master ratio controller 92 controls gas control valve 44 and thus the amount of gas passed to the burners by that valve.

It is desirable to maintain an oxidizing atmosphere in the melter and thus the ratio control is set to cause the burners 21 to develop an oxidizing flame. A monitoring of the flue gases to insure maintenance of the oxidizing atmosphere is accomplished by an oxygen analyzer 85 whose signal is passed by an oxygen analyzer transmitter 86 to the master ratio controller 92 as a trimming or bias signal on the master ratio controller output signal to gas control valve 44.

Joule effect heating of the material in the melter is accomplished by passing current between electrodes 71, 72 and 73, typically in rows extending transverse of the longitudinal axis of the melter between the region of the doghouses 68 in which batch is introduced and the throat 55 from which molten glass is withdrawn, to establish heating zones along the melter length. As disclosed in the aforementioned Holler et al. patent application, each pair of electrodes is supplied from a source of pulsating current having alternately opposite polarity as by phase firing control of alternating current through parallel SCRs connected with opposing polarities or by time proportioned cycles so that balanced current flow occurs in both directions between electrode pairs over a given interval.

Master ratio controller 92 controls Joule effect heating through master Joule effect heat control 77 by means of a heat control transmitter 93, which issues control signals scaled to the desired heat levels and changes in heat.

Generally, coordination of the control of the source of heat above the constituents within the melter, the fuel burners, with the control of the source of heat below the constituents, the current flow between electrodes immersed in the melt, is illustrated as accomplished by means of a processor in FIG. 1. Master ratio controller 92, is shown responsive to heat requirements in the melter as particularly illustrated by crown thermocouple 52 in the region of the hottest spot along the length of the melter. However, it might also be controlled by an underglass thermocouple 53 at or near the hottest spot along the length of the melter within the melter constrained glass constituents or by other heat requirement sensors. It is to be appreciated that other indicators of heat requirements might be applied to the processor 48 or master ratio controller 92 as individual or augmenting inputs to establish controlling output signals to the two heating systems. In the following discussion of particular arrangements a ratio controller has been substituted for the processor and the primary heat requirement signal source has been shown to be the temperature sensor in the most intimate heat transfer relation to the primary source. Thus where primary heat is developed above the melt, the crown thermocouple has been shown to provide primary control. Where primary heat is developed within the melt the floor thermocouple has been shown to provide primary control.

Many alternative control loops suggest themselves for coordination of the control of fossil fuel heating within the melter combustion space with the Joule effect heating within the melt. The reaction of the ratio controller 92 to changes in combustion air flow is a proportionate change in the fuel admitted to the burners and a proportionate change in the current to the current transmitter providing an input signal to the master control station whereby the several zone control consoles 74, 75 and 76, are adjusted to alter the electrical current in a manner to displace the thermal profile in the furnace attributable to Joule effect heating in a corrective direction relative to the initiating thermal deviation. Secondary interactions occur in any such shift which in part, at least, are subordinated by a negative feedback of a signal scaled to fuel flow, derived from fuel flow cell 43 and fuel flow transmitter 83, and applied to ratio controller. A further corrective signal is imposed on the ratio controller in response to any deviation in the oxidizing nature of the gases in the melter combustion space and flue by virtue of a signal scaled to the deviation from a set oxidation level and derived from oxygen analyzer through oxygen transmitter 86.

In the Joule effect heating section, the individual zone controls experience secondary control responses. As the temperature of the molten glass in their respective zones change, deviations from the proportion dictated to the master control by the ratio controller 92 can occur in the individual zones. These deviations, as sensed by the individual zone thermocouples, develop corrective signals within their respective zone controls.

Since interaction between the various heat sources and sensors create dynamic signal and control states, and since a stable condition at the desired parameters is desired, it is advantageous to provide appropriate signal and control damping within the several transmitters and controls. Such damping reduces hunting and while it may somewhat delay the attainment of the desired condition it minimizes overshoot and enables stability to be achieved more rapidly in the system.

In the particular system under consideration, typically the fossil fuel burners supply two thirds of the heat while the Joule effect heating system supplies one third of the heat. Coordinated ratio control enables that relationship to be retained in response to deviations from desired conditions such that a drop in temperature increases the thermal input of the fossil fuel burners to supply two thirds of the additional heat required while the Joule effect heating provides the additional one third.

FIG. 4

Figure 4:
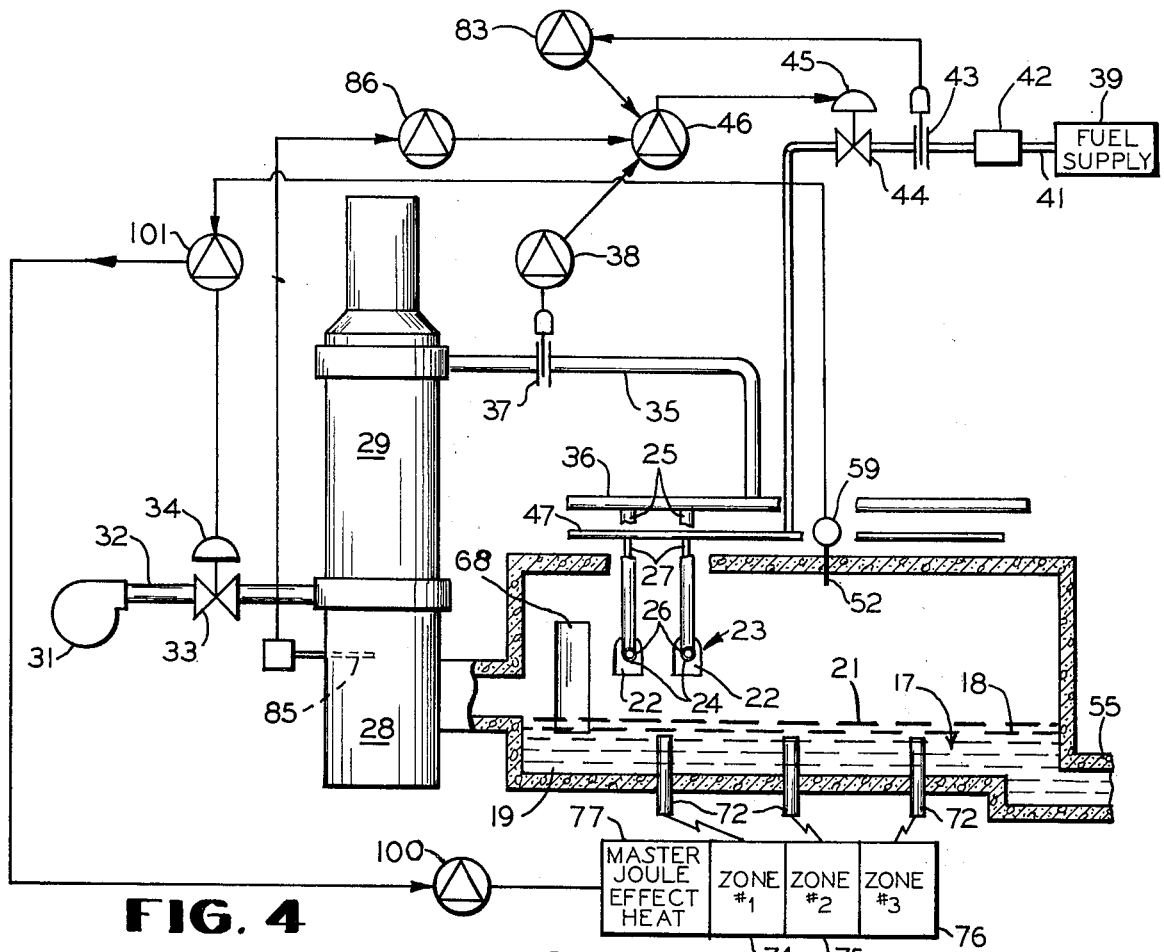
FIG. 4 is a view similar to FIG. 3 for a fossil fuel fired system in which electric boost control is derived as a proportion of the temperature control measured at the melter crown.
Figure 5:
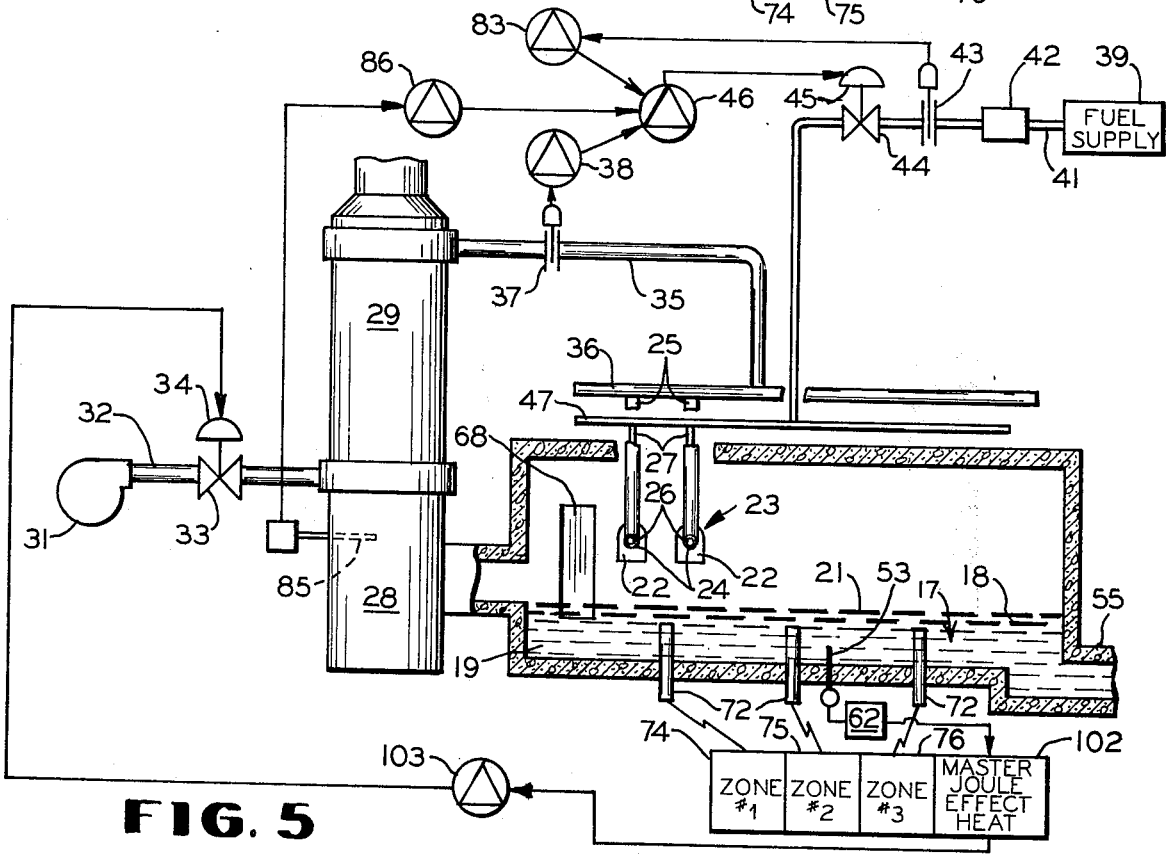
FIG. 5 is a view similar to FIG. 3 for a furnace operated in an electric melt-fossil fuel boost mode where the electric melt control dictates the fossil fuel heat on a proportional basis through the combustion air control.

A fossil fuel fired electric boost melter system is shown in FIG. 4. The preponderance of the heat supplied to the constituents within the melter is derived from the fossil fuel burners 23 as in the case of FIG. 3 and the dominant thermal sensing for control purposes is performed in the crown above the region of the melt hot spot by means of crown thermocouple 52. The electrical signal representative of crown temperature, passed by temperature transmitter 59 to the temperature controller 101, controls both the burner supplied heat and Joule effect supplied heat from that controller. A deviation of indicated temperature from the set point temperature in temperature controller 101 results in compensating signals scaled to proportion the alteration of the fossil fuel burner heat inputs, and the Joule effect heating input to establish the set point temperature at the crown, for example, a signal indicating a drop in temperature below the deviation from the set point permitted by the dead zone built into temperature controller 101 will cause a signal to be issued to combustion air control valves 33 scaled to increase the heat from the fuel burners 23 by two-thirds of the heat quantity required to raise the temperature to within the set point range, where it is assumed that fossil fuel firing provides two-thirds of the heat. In that case, a signal is applied to the current transmitter 100 which is scaled at the master controller 77 to increase the Joule effect heating by one-third of the requisite additional heat. The reactions of the fossil fuel fired heating system are as previously indicated wherein the increased combustion air is indicated to the ratio controller 46 which issues a signal to the fuel control valve 44 making an appropriate proportional increase in fuel to match the increase in combustion air at the burners. Feedback of the flow of fuel from fuel flow sensor 43 is applied to the ratio controller 46 together with a final trimming of the ratio in response to the output of oxygen analyzer 85 and the signal changes from oxygen transmitter 86 which may be caused by any deviation of the oxidation state of the gases within the melter from those established by predetermined set points. Thus an oxidation error signal also contributes to the setting of the signal issued by ratio controller 46.

FIG. 5

A melter with fossil fuel burners for heating the melter combustion space and rows of electrodes with zone control consoles and a master control, where the fossil fuel burner heat control and the Joule effect heating control are of the same general nature as discussed above, is disclosed in FIG. 5 arranged for electric melting as the primary source of heat with fossil fuel boosting. In this example, the electric melt controls can be considered the master or dominant control and the fossil fuel controls, the slave control. A thermal profile of the type discussed above, wherein temperature peaks to a hot spot downstream of the longitudinal center of the melter is established in this embodiment as in those discussed above. Since Joule effect heating is the primary power source, primary control of temperature in the melter and melt is by means of an underglass thermocouple 53 in the floor of the melter which generates an e.m.f. for a temperature transmitter 62 which provides the control signal for the master controller 102.

In this embodiment, the master controller 102 is arranged to incorporate set point controls for the temperature desired at the hot spot and a comparator which provides an error signal representative of the deviation of the temperature as sensed at thermocouple 53 from the predetermined set point. Any such deviation results in signals to the several zone controllers 74, 75 and 76 and to the current transmitter 103 which in this embodiment transmits control signals to the combustion air flow valve top works 34.

If we assume, for purposes of illustration that the Joule effect heating provides two-thirds of the heat to the glass melt, and if it is assumed that the proportion is maintained constant for any deviations from the desired set point, two-thirds of the change in heat input is effective from controller 102 and its internal proportioning means on the individual zone controller 74, 75 and 76 to adjust the temperature of the glass along the entire thermal profile whereby the hot spot temperature is brought into conformity with the predetermined set point temperature, and a signal scaled to give a change of one-third in the fossil fuel heating of the melt is applied directly to the combustion air control 34 and indirectly by the resultant air flow to the ratio controller 46.

The signal from current transmitter 103 acts upon top works 34 which causes a change in the supply of combustion air to the burners by altering the setting of combustion air control valves 33. The resultant change in rate of flow of combustion air detected by flow sensor 37 as a signal to flow transmitter 35 produces a signal indicating a deviation from the set point for the flow transmitter as a primary signal to ratio controller 46 to cause an appropriate change in the setting of gas control valve 44. The new setting of combustion air flow and gas flow alters the heat developed in the fuel burners and the oxidizing property of the atmosphere are analyzed by oxygen analyzer 85 which sends a signal to be compared with a set point value at oxygen transmitter 86. This produces a trimming error signal to ratio controller 46. In addition, the change in rate of flow of the fuel to the burners as sensed by flow sensor 43 is sent to fuel flow transmitter 83 where its signal is translated for ratio controller 46.

In the electrical heating controllers 74, 75 and 76 the signal from master controller 102 applies proportionate changes in the control signals to each of the zone controllers whereby the current flowing between the several electrode pairs in each row of electrodes is altered to change the temperature of the molten glass in the zone heated by that row of electrodes. Corrective action for individual zone controllers is, as in the previous cases, effected by means of the feedback from the individual zone thermocouples (not shown) as a feedback signal to the respective zone controllers to assure that the corrective heating in the respective zones is within the range dictated by the system. Where such correction is out of range, the controls of the aforenoted Holler-Rothrock co-pending Patent application are effective as to the individual zones to achieve the desired heating effects.

From the embodiments shown it is evident that the combustion air to fossil fuel ratio controller can be utilized as a ratio controller between the fossil fuel burner heat source and the Joule effect heating heat source and can be arranged to maintain a predetermined relationship of the amount of heat supplied to the constituents within the melter through the operational deviations in temperature, experienced in the melter. Alternatives to the processor type of control or ratio type of control derived from the combustion air fuel ratio controller are also available. For example, the combustion air transmitter issuing the signal to the combustion air valves can be a ratio controller as well as a controller responsive to deviations from a set point of temperature.

The several variants of the proposed system of correlating heaters effective in the combustion space above the melt and heaters for heating within the melt suggest many variations in the control combinations disclosed. Accordingly it is to be appreciated that the above described systems are illustrative of the principles of the invention and are not to be read in a limiting sense.

I claim:

1. Apparatus for melting and maintaining a heat softenable material at a desired temperature comprising a container for said material; lower heating means in said container adapted to apply heat to the material from within the body of the material; upper heating means in said container adapted to apply heat to the material from above the body of the material; means for sensing a required change in the amount of heat applied to the body of material; first means to adjust the amount of heat applied to said material by said lower heating means; second means to adjust the amount of heat applied to said material by said upper heating means; and means responsive to said means for sensing a required change in the amount of heat applied to actuate both said first and second adjusting means including a ratio controller for issuing control signals to the respective first and second adjusting means in a predetermined relationship to satisfy said required change in the amount of heat applied.

2. Apparatus according to claim 1 wherein said heat softenable material is glass, said upper heating means is a fossil fuel burner and said lower heating means is an electrical system developing Joule effect heating within the body of the glass material.

3. Apparatus according to claim 1 wherein said means for sensing a required change in heat applied to the body of material includes means indicating a magnitude of required change in heat applied to the body of material to establish a desired temperature for the body.

4. Apparatus according to claim 3 wherein said means for sensing a required heat change senses the temperature within the material.

5. Apparatus according to claim 4 wherein said means for sensing a required heat change is located under the surface of the material.

6. Apparatus according to claim 3 wherein said means for sensing a required heat change senses the temperature above the material.

7. Apparatus according to claim 6 wherein said container is enclosed above the material by a crown and said temperature sensing means is located in said crown.

8. Apparatus according to claim 1 wherein said lower heating means includes a source of electrical power and electrodes in contact with said material and electrically connected to said source of power; and wherein said first means to adjust is a control for the amount of power transmitted from said source to said electrodes for Joule effect heating of the material.

9. Apparatus according to claim 8 wherein said control for the amount of power includes means to issue a control signal for said second adjusting means in a predetermined ratio to the amount of power supplied said material.

10. Apparatus according to claim 1 wherein said upper heating means includes a source of a combustible mixture and a burner for said mixture; and wherein said second means to adjust is a control for the amount of combustible mixture supplied to said burner.

11. Apparatus according to claim 1 wherein one of said upper and lower heating means is the preponderant source of heat applied to the material; a first control means for said first adjusting means; a second control means for said second adjusting means; and wherein said means to actuate said first and second adjusting means includes said control means for the preponderant heating means.

12. Apparatus according to claim 11 wherein said lower heating means is the preponderant source of heat and includes a source of electrical power and electrodes in contact with said material and electrically connected to said source of power to apply electrical power to said material for Joule effect heating; and wherein said first means to adjust is a control for the amount of electrical power transmitted from said source to said electrodes for control of the Joule effect heating of the material.

13. Apparatus according to claim 12 wherein said upper heating means includes a source of a combustible mixture and a burner for said mixture; and wherein said second means to adjust is a control for the amount of combustible mixture supplied to said burner.

14. Apparatus according to claim 11 wherein said upper heating means is the preponderant source of heat and includes a source of a combustible mixture and a burner for said mixture; and wherein said second means to adjust is a control for the amount of combustible mixture supplied to said burner.

15. Apparatus according to claim 14 wherein said lower heating means includes a source of electrical power and electrodes in contact with said material and electrically connected to said source of power to apply electrical power to said material for Joule effect heating; and wherein said first means to adjust is a control for the amount of electrical power transmitted from said source to said electrodes for control of the Joule effect heating of the material.

16. Apparatus according to claim 11 wherein said control means for the preponderant heating means is a ratio controller to maintain a given ratio of heat applied by said respective upper and lower heating means.

17. Apparatus according to claim 1 wherein said upper heating means is an air-fuel burner and said means to actuate said first and second adjusting means is a ratio controller for air and fuel supplied said burner, including means to issue a control signal for said first adjusting means in a predetermined ratio to the air-fuel supplied said burner.

18. Apparatus according to claim 1 wherein said upper heating means is an air-fuel burner and said means to actuate said first and second adjusting means is a supply control for combustion air supplied said burner, including means to issue a control signal for said first adjusting means in a predetermined ratio in the air supplied said burner.

19. The method of operating a glass melter which comprises heating the melter with fossil fuel burners above the glass constituents therein; heating the glass with Joule effect heating; sensing the amount of heat required to establish and maintain a predetermined temperature in the glass; and operating a common control for both the fossil fuel burners and the Joule effect heating to establish and maintain a predetermined relationship between the amount of heat developed by the fossil fuel burners and that amount of heat developed with Joule effect heating.

20. The method according to claim 19 wherein the predetermined relationship is a constant ratio within a range of operating temperatures for the melter.

21. The method according to claim 19 including the step of monitoring temperature in the melter to sense the amount of heat required; and wherein said predetermined relationship is a function of the monitored temperature.

* * * * *